June 2, 1925.

J. MASSICOTTE

AUTO ALARM

Filed June 22, 1923

1,540,177

Inventor:
Joseph Massicotte
By Louis M. Schmidt
Atty.

Patented June 2, 1925.

1,540,177

UNITED STATES PATENT OFFICE.

JOSEPH MASSICOTTE, OF WATERBURY, CONNECTICUT.

AUTO ALARM.

Application filed June 22, 1923. Serial No. 647,153.

*To all whom it may concern:*

Be it known that I, JOSEPH MASSICOTTE, a citizen of the Dominion of Canada, residing at Waterbury, in the county of New Haven and State of Connecticut, have invented certain new and useful Improvements in Auto Alarms, of which the following is a specification.

My invention relates to improvements in auto alarms, of the form that is adapted to sound an alarm in the case of an unauthorized starting of an automobile and thereby reduce the liability of theft thereof, and the object of my improvement is to produce an alarm device that is under the control of the regular operator of the car and can be set so that upon the starting of the car the alarm will be sounded, the operation thereof following upon the jar or shaking of the car that is incidental to the operation of the engine, one means of effecting the result consisting of closing an electric circuit for operating an electric bell.

In the accompanying drawing:—

Figure 1:
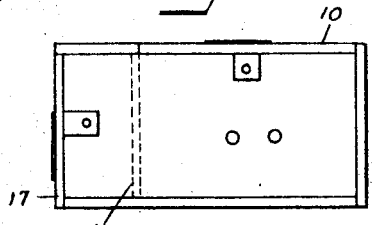
Figure 1 is a side elevation of my improved auto alarm, with part of the front wall broken away so as to disclose certain parts of the interior structure and the devices that are housed therein.
Figure 2:
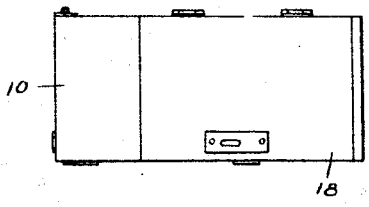
Figure 2 is a plan view of the same.
Figure 3:
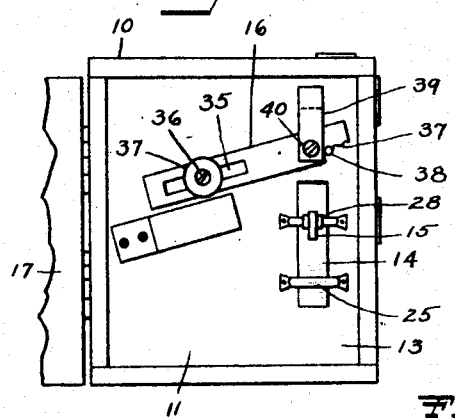
Figure 3 is an end elevation on an enlarged scale with the end door in the open position.
Figure 4:
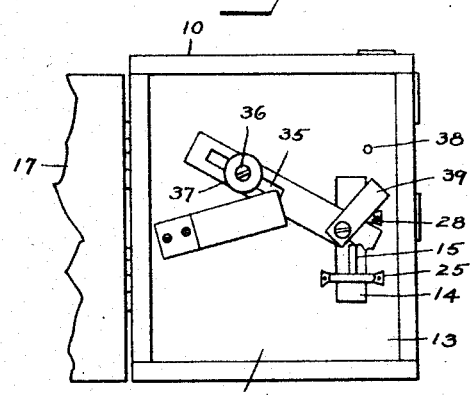
Figure 4 is a similar view with the parts in a different position.
Figure 5:
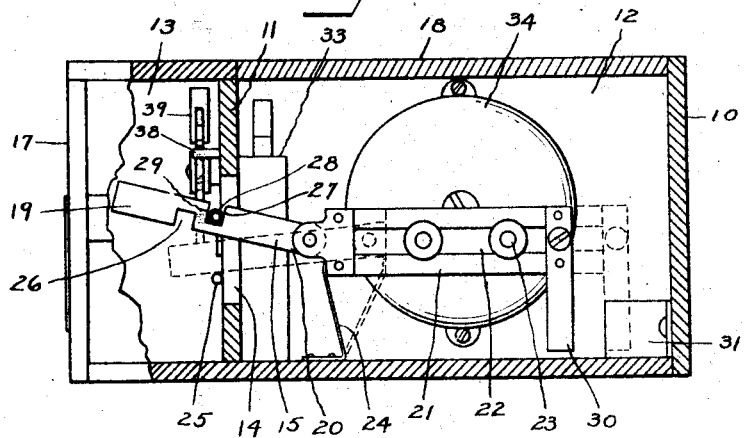
Figure 5 is a sectional view close to the front wall, showing the operating mechanism.

My improved auto alarm comprises a box-like housing 10 that is adapted to be secured to the floor of an automobile or in any other position that may be convenient and the interior is divided by means of a cross-partition 11 into a bell-chamber 12, at the right in Fig. 5, and a trigger-chamber 13 at the left.

The partition 11 has a slot 14 through which extends a catch-bar 15 that cooperates with certain parts in the trigger-chamber 13 one of which is the trigger member 16.

A door 17 closes the outer end of the trigger-chamber 13 and a cover 18 is provided on the top of the bell-chamber 12, suitable key-controlled locks being provided to prevent unauthorized opening of said door and cover.

The free end portion 19 is the part of the catch-bar 15 that projects through to slot 14 into the trigger-chamber 13 and the inner end 20 thereof is pivotally connected to one end of a bar or plate 21 that is mounted in any proper manner for longitudinal movement in the horizontal position.

As shown, said plate 21 has a longitudinal slot 22 that engages with a pair of guide-pins 23 that are positioned in spaced relation.

A spring 24 engages with the plate 21 and tends to push the same towards the right, which corresponds to the inoperative position.

When in such inoperative position the catch-bar 15 is dropped to the bottom position and it rests upon a rest-bar 25 that bridges the lower portion of the partition-slot 14 and preferably a notch 26 may be provided in the lower edge portion for housing the said rest-bar 25.

For locking the catch-bar 15 in the outer position, in opposition to the spring 24, there is provided in the upper edge thereof a notch 27 that cooperates with an upper bridge or bar 28 that extends across the slot 14.

The parts are constructed and arranged so that the frictional engagement of the upper, locking bridge-bar 28 with the locking notch 27, that is to say with the opposed outer wall 29 of said notch 27, serves to hold the catch-bar 15 in the locked position, whereby when released from such locked position the spring 24 operates to push the plate 21 toward the right, which corresponds to the alarm-sounding position.

As a detail, for sounding the alarm, the slide-plate 21 carries a switch-blade 30 that cooperates with the fixed contact 31 for closing an electric circuit.

Other elements in the electric circuit are a battery or cell and an electric-bell. The structure 33 shown in Fig. 5 that is positioned against the partition 11 is a housing or casing for a dry battery. Also, in Fig. 5 is shown the bell proper 34. The battery and the bell of themselves are of ordinary form.

The free end portion 19 of the catch-bar 15 is operated upon by the trigger member 16 for effecting the release thereof from engagement with the bridge-bar 28.

The trigger member 16 in the set position extends in parallelism with the partition 11 so as to be at right-angles with the catch-bar 15 and appreciably above the same, and is adapted to be dropped by shaking or jarring so as to strike the free end portion 19 of the catch-bar 15.

As to details, said trigger member is in the form of a plate-like bar that has a longitudinal slot 35 by means of which it is mounted on the pin 36 for limited longitudinal and rotative movement, being guided by means of a washer 37 or in any proper manner.

In the set position mentioned, the trigger member is set at an upward inclination with the inner end portion supported by the pin 36 and the outer end portion is supported by means of the lower edge 37 which rests upon a pin 38, said lower edge being, as shown, slightly roughened or serrated to provide an appreciable holding effect.

A cross-piece 39 secured to the trigger member 16 by means of the screw 40 engages with the pin 38 and limits the outward overhang of the edge 37 beyond the supporting pin 38. Said cross-piece 39 also adds to the weight so as to facilitate the release of the catch-bar 15 when the trigger member 16 is freed from engagement with the supporting pin 38.

Such release is effected by gravity in the structure shown and in the manner mentioned, which is by jarring due to the shaking of the car structure by the operation of the engine.

The trigger member 16 is freed from engagement with the pin 38 by the jar that is effected in the structure of the automobile by the operation of the engine, the resulting agitation being sufficient to momentarily elevate the free end portion of said trigger member to permit of disengagement of the lower roughened or serrated edge 37 from the holding pin 38. Previous to such agitation the trigger member 16 is supported at the free end portion by the holding pin 38 by reason of the engagement therewith of the roughened or serrated edge 37 and the body portion is supported by the supporting pin 36 that is housed in the guide-slot 35, and the position of the trigger member is such that it is inclined generally from the holding pin 38 downwardly towards the supporting pin 36, whereby the trigger member tends to slide downwardly and away from the holding pin 38. The latter may be designated as the upper pin and the pin 36 as the lower pin. The slot 35 permits of sufficient sliding of the trigger member 16 to fully release the free end and contact edge 37 thereof from the upper pin 38 so that the free end portion will drop, the lower pin 36 serving as a pivotal pin for the rotative movement involved. In falling the trigger member strikes the free end portion 19 of the catch-bar 15 a hammer blow that serves to release it from engagement with the bridge-bar 28. The spring 24 then operates to slide the plate or bar 21 towards the right so as to effect a closing of the contacts 30 and 31.

The sensitiveness of the device is determined by such factors as the inclination of the trigger member 16; the length of the contacting serrated edge 37; the depth of the notches therein for individually seating on the pin 38; the number of such notches; and the weight of the falling parts that effect the hammer blow.

As the agitation is continued the contacting edge 37 jumps along from notch to notch in the engagement with the pin 38 until finally the tip end of the trigger member 16 passes the same and the trigger member drops and releases the alarm sounding mechanism.

I claim as my invention:—

1. In a disturbance actuated circuit closer, a moving circuit closing member and a tripping device for actuating the same, said tripping device comprising a tripping member in the form of a bar-like device that is operatively supported by a pair of pins, said pins being in spaced relation, said bar-like device having a slot for one of said pins for permitting of longitudinal movement, the other of said pins being positioned at a higher elevation than said one pin, and said bar-like device having at the free end a bearing contact edge for resting upon said other pin.

2. In a disturbance actuated circuit closer as described in claim 1, said bearing contact edge having a series of notches for engagement with the opposed pin.

3. In an auto alarm, a spring actuated moving member that is held back in opposition to said spring by means of a notch and pin structure, a tripping device for releasing said moving member comprising a tripping member in the form of a bar-like device that is supported by its body portion for limited sliding and rotative movement and has adjacent the free end a contact edge, a pin for cooperating with said edge, and positioned so as to provide an inclined position for said tripping member, and serving when engaged with said edge to limit such rotative movement, the tripping member being operative to be released from said pin by a longitudinal movement responsive to agitation of the alarm structure and to follow such release by such rotative movement, and said moving member having a part for cooperating with said tripping member that is in the path of said tripping member.

JOSEPH MASSICOTTE.